Patented May 12, 1953

2,638,436

UNITED STATES PATENT OFFICE 2,638,436

CULTURE OF PHAGE-SENSITIVE STREPTOMYCES GRISEUS

David Perlman, Princeton, and Asger F. Langlykke, Highland Park, N. J., assignors, by mesne assignments, to Mathieson Chemical Corporation, Baltimore, Md., a corporation of Virginia No Drawing. Application June 11, 1949, Serial No. 98,627

6 Claims. (Cl. 195—80)

The methods of this invention essentially comprise culturing a phage-sensitive actinomycete in contact with a nutrient medium containing an aliphatic (including cycloaliphatic) acid or water-soluble salt thereof, especially an acyclic carboxylic acid or water-soluble salt thereof, which acid or salt is capable of combining with a water-soluble calcium salt to form a biologically-unavailable calcium compound.

In the culturing of Streptomyces griseus, for example, to produce streptomycins, vitamin $B_{12}$ (including vitamin $B_{12}$-like substances) and/or actidione, it has been possible to select or develop strains of the organism that grow in the presence of various types of phages, thus minimizing the possibility of loss of production due to phage action against the organism. However, it has been difficult or impossible to obtain a strain resistant to all types of phage which can occur in such cultures; and it would obviously be desirable to have such strain, or alternatively, to be able to culture the organism under conditions which minimize phage action (and, of course, have no undesirable effect on the growth of the organism and production of the desired product).

It has been found that phage multiplication in cultures of phage-sensitive actinomycetes may be inhibited (and phage action thus minimized), without sacrificing growth of the organism or production of the desired product, by including in the culture an aliphatic acid or water-soluble salt thereof, which acid or salt is capable of interacting with a water-soluble calcium salt to form a biologically-unavailable calcium compound. Among such phage-multiplication inhibitors are the following groups of acids (and water-soluble salts thereof): hydroxy acyclic carboxylic acids, as exemplified by lactic acid, tartaric acid, gluconic acid and citric acid; acyclic polycarboxylic acids, as exemplified by oxalic acid (and also tartaric and citric acids); and phosphoric acid derivatives of cycloaliphatic hydroxy compounds, as exemplified by phytic acid (inositol hexaphosphoric acid).

It is believed that these compounds function as inhibitors by virtue of their ability to combine with water-soluble calcium compounds to form water-insoluble calcium compounds or unionized complexes of calcium and the aliphatic acid—the calcium in such compounds and complexes being unavailable to the organism and phage.

The preferred acids are those which are slowly metabolized by the organism (e. g., citric and oxalic acids), and hence are available for inhibition of phage multiplication for substantially the whole culture period; but rapidly metabolized acids may be employed if they (e. g., tartaric and gluconic acid) are added at intervals through the culture period.

The aforementioned water-soluble salts comprise especially the alkali-metal (including ammonium) salts, notably the sodium salt; but salts with other cations, especially cations whose presence is desired to enhance the production of a particular product (e. g., cobalt to enhance vitamin $B_{12}$ production), may be employed as inhibitors (such salt being exemplified by cobalt citrate).

The invention is applicable to the culture of phage-sensitive actinomycetes generally: inter alia, to the culture of Streptomyces griseus to produce streptomycins, vitamin $B_{12}$, and/or actidione; to the culture of Actinomyces (Streptomyces) lavendulae to produce streptothricin; to the culture of Streptomyces venezuelae to produce chloromycetin; and to the culture of a Streptomyces species closely resembling Streptomyces fradiae Waksman and Curtis to produce neomycin.

The phage-multiplication inhibitor may be added to the inoculum, to the culture medium before inoculation, or (preferably) at both stages. The inhibition is directly correlated with the concentration of the inhibitor in the culture and indirectly correlated with the rate at which the particular acid involved is metabolized by the organism. Thus, sodium citrate is relatively ineffective at an initial molar concentration of 0.003, but effective at initial molar concentrations of 0.01 and 0.03 (the latter concentration, though an excess from the standpoint of inhibition, not interfering with either growth or production of the desired product); on the other hand, sodium tartrate in an initial molar concentration of 0.01 is relatively ineffective (because tartaric acid is rapidly metabolized by the organism), but effective at an initial molar concentration of 0.03. In general, the inhibitors are effective at molar concentrations of the order of 0.03.

The invention is especially applicable to, and is described in detail in connection with, the culture of Streptomyces griseus to produce streptomycin and/or vitamin $B_{12}$, notably to such production by submerged culture in a liquid medium containing soybean meal as the substantially sole source of nitrogenous and growth promoting substances, and (where enhancement of vitamin $B_{12}$ production is desired) containing also a water-soluble, nontoxic cobalt salt, inter alia, cobalt chloride and cobalt nitrate, The following examples are illustrative of the invention:

*Example 1*

(a) An aqueous (tap water) medium containing 1.5% soybean meal, 2.0% glucose, and 0.1% sodium chloride is distributed into 500 ml. Erlenmeyer flasks, 100 ml. per flask; the pH of the medium is adjusted to 6.8–7.2 by addition of sodium hydroxide; and the flasks are plugged with nonabsorbent cotton and sterilized by autoclaving. When cool, each of the flasks is inoculated with 5% of the medium's volume of a 40-hour vegetative growth (second vegetative transfer) of a culture of *Streptomyces griseus* grown in an aqueous medium containing 1.5% soybean meal, 2.0% glucose, and 0.5% sodium chloride, and the flasks are mechanically shaken at 25° C. At the end of four days, the pH of the culture liquid is about 6.4, and its streptomycin potency is about 313 units/ml.; and at the end of five days, these figures are respectively about 7.8 and about 349.

(b) If, when culturing *Streptomyces griseus* under the foregoing conditions, an actinomyces phage (or phage mixture) is present at the time of inoculation to the extent of $2 \times 10^6$ phage particles/ml., the following results are obtained: at the end of four days, the pH of the culture liquid is about 6.15, its streptomycin potency about 294; and the phage count thereof about $2.6 \times 10^9$; and at the end of five days, these figures are respectively about 7.75, about 295, and about $5.9 \times 10^9$.

(c) If the medium in which *Streptomyces griseus* is grown as described in *a* contains sodium oxalate in a concentration of 0.01 molar, the following results are obtained: at the end of four days, the pH of the culture liquid is about 7.3 and its streptomycin potency about 366 units/ml.; and at the end of five days, these figures are respectively about 7.1 and about 400. [This increase in streptomycin titer (cf. *a*) due to inclusion of sodium oxalate involves no undesirable effect on the other results of the culturing, i. e., ratio of streptomycin A to streptomycin B produced, production of vitamin $B_{12}$, or production of actidione; and the recovery of the streptomycin and/or these other products is effected in the same manner as the recovery from the prior media containing no sodium oxalate.]

(d) If, when culturing *Streptomyces griseus* as described in *c*, the actinomyces phage referred to in *b* is present at the time of inoculation to the extent of $2 \times 10^6$ phage particles/ml., the following results are obtained: at the end of four days, the pH of the culture liquid is about 7.45, its streptomycin titer is about 345 units/ml., and the phage count thereof is about $1.5 \times 10^5$; and at the end of five days, these figures are respectively about 7.35, about 400, and about $6 \times 10^4$. [Comparison of these figures with the corresponding figures in *b* reveals that the inhibition of phage multiplication by inclusion of sodium oxalate results in an about 35% increase in streptomycin yield; or viewed otherwise, comparison with the corresponding figures in *a* reveals that the inclusion of sodium oxalate is not only insurance against the reduction of streptomycin yield by the action of phage contamination or infection of the culture, but may also be advantageous even when such contamination does not occur.]

*Example 2*

Satisfactory inhibition of phage multiplication in the culturing of *Streptomyces griseus* as described in *a* (Example 1), without diminishing (and in most cases, increasing) streptomycin titer, may be obtained by the indicated molar concentration of the following salts

| | |
|---|---|
| Sodium citrate | 0.01 |
| | 0.03 |
| Sodium gluconate | 0.03 |
| Sodium oxalate | 0.003 |
| | 0.03 |
| Sodium tartrate | 0.03 |
| Sodium lactate | 0.03 |
| Sodium phytate | 0.03 |

Lower molar concentrations of the sodium gluconate, sodium tartrate and sodium lactate may be employed, if these salts are added at intervals throughout the culture period, e. g., if sufficient salt is added to substantially maintain the molar concentration at about 0.01.

*Example 3*

(A) If, when culturing *Streptomyces griseus* under the conditions described in *a* (Example 1), an actinomyces phage is present in the culture medium before inoculation to the extent of $2 \times 10^9$ phage particles/ml., at the end of seven days the pH of the culture liquid is about 7.90, its streptomycin potency about 328 units/ml., and the phage count thereof is about $4 \times 10^8$.

(B) If sodium citrate has been included in the culture medium used in A in 0.01 molar concentration, the following results are obtained at the end of seven days: pH, about 8.25; streptomycin potency, about 426 units/ml.; and phage count, about $1.5 \times 10^6$.

(C) If, when culturing *Streptomyces griseus* under the conditions described in *a* (Example 1), the actinomyces phage referred to in A is present in the inoculum added to the extent of $1 \times 10^6$ phage particles/ml., the following results are obtained: at the end of four days, pH about 5.90, and streptomycin potency about 339 units/ml.; and at the end of seven days, the pH is about 7.70, streptomycin potency about 313 units/ml., the phage count thereof is about $4 \times 10^8$.

(D) If sodium citrate has been included in the culture medium used in C in 0.01 molar concentration, the figures corresponding to those given in C are respectively: four days, pH about 6.95, streptomycin potency about 488; and seven days, pH about 8.10, streptomycin potency about 402, and phage count about $8 \times 10^5$.

(E) If sodium citrate has been included in both the culture medium and inoculum used in A in molar concentrations of 0.01, the following results are obtained through the actinomyces phage referred to in A is present in the culture medium to the extent of $3 \times 10^7$ phage particles/ml.: four days, pH about 7.15, and streptomycin potency about 473 units/ml.; and seven days, pH about 8.20, streptomycin potency about 503 units/ml., and phage count about $2 \times 10^4$. If the phage contamination is through the inoculum to the extent of $2 \times 10^4$ phage particles/ml. inoculum, the corresponding seven day figures are: pH about 8.43; streptomycin potency about 500 units/ml.; and phage count about $1 \times 10^5$.

*Example 4*

(I) An aqueous medium containing 1.5% soybean meal, 2.0% glucose, 0.0005% cobaltous nitrate hexahydrate, and 0.1% sodium chloride is distributed into 500 ml. Erlenmeyer flasks, 100 ml. per flask; the pH of the medium is adjusted to 6.8–7.2 by addition of sodium hydroxide, and the flasks are plugged with nonabsorbent cotton and sterilized by autoclaving. When cool, each of the flasks is inoculated with 5% of the medium's volume of a 40-hour vegetative growth (second vegetative transfer) of a culture of *Streptomyces griseus* grown in an aqueous medium containing 1.5% soybean meal, 2.0% glucose, and 0.5% sodium chloride, and the flasks are mechanically shaken at 25° C. At the end of four days, the pH of the culture liquid is about 6.5, its streptomycin potency is about 475 units/ml., and its vitamin $B_{12}$ content about 0.25 micrograms/ml.; and at the end of six days, these figures are respectively about 7.5, about 600, and about 0.41.

(II) If sodium citrate has been included in the culture medium used in I in 0.01 M concentration, the figures corresponding to those given in I are respectively: four days, pH about 6.8, streptomycin potency about 453, vitamin $B_{12}$ content about 0.27; six days, pH about 7.3, streptomycin potency about 557, and vitamin $B_{12}$ content about 0.40. [Comparison of these figures with the corresponding figures in I reveals that the inhibition of phage multiplication by inclusion of sodium citrate involves no sacrifice of vitamin $B_{12}$ production. Recovery of the vitamin $B_{12}$ (and streptomycin) is effected in the same manner as the recovery from the prior media containing no sodium citrate.]

The invention may be variously otherwise embodied within the scope of the appended claims.

We claim:

1. In the method of culturing a phage-sensitive strain of *Streptomyces griseus* in contact with a suitable culture medium to produce a metabolite of the group consisting of streptomycin and vitamin $B_{12}$, minimizing possibility of loss of production of said metabolite due to phage action by incorporating in the medium a phage-multiplication inhibitor of the group consisting of lactic acid, tartaric acid, gluconic acid, citric acid, oxalic acid, phytic acid, and water-soluble salts thereof, the initial molar concentration of the oxalic acid and oxalates being at least of the order of 0.003, of citric acid and the citrates being at least of the order of 0.01, and of the remaining members of the group being at least of the order of 0.03.

2. The method defined by claim 1, in which the phage-multiplication inhibitor is a member of the subgroup consisting of citric acid, oxalic acid, and salts thereof.

3. The method defined by claim 1, in which the phage-multiplication inhibitor is a member of the subgroup consisting of tartaric acid, gluconic acid, and salts thereof, and in which said inhibitor is added to the medium at intervals through the culture period.

4. The method defined by claim 1, in which the phage-multiplication inhibitor is an alkali-metal citrate.

5. The method defined by claim 1, in which the phage-multiplication inhibitor is an alkali-metal oxalate.

6. The method defined by claim 1, in which the phage-multiplication inhibitor is incorporated in the inoculum of *Streptomyces griseus* added to the medium.

DAVID PERLMAN.
ASGER F. LANGLYKKE.

References Cited in the file of this patent

UNITED STATES PATENTS

| Number | Name | Date |
| --- | --- | --- |
| 2,422,230 | Foster | June 17, 1947 |
| 2,461,922 | Rake | Feb. 15, 1949 |
| 2,473,817 | Phelps | June 21, 1949 |
| 2,483,855 | Stilles | Oct. 4, 1949 |
| 2,516,682 | Donovick et al. | July 25, 1950 |

OTHER REFERENCES

Thornberry: Phytopathology 36, May 1946, page 412.

Woodruff et al.: Jour. Bact. 54, 1947, pages 535–541.

Smith: Nature, 161, April 24, 1948, page 638.

Rickes et al.: Science, 108, December 3, 1948.